Figure 1:
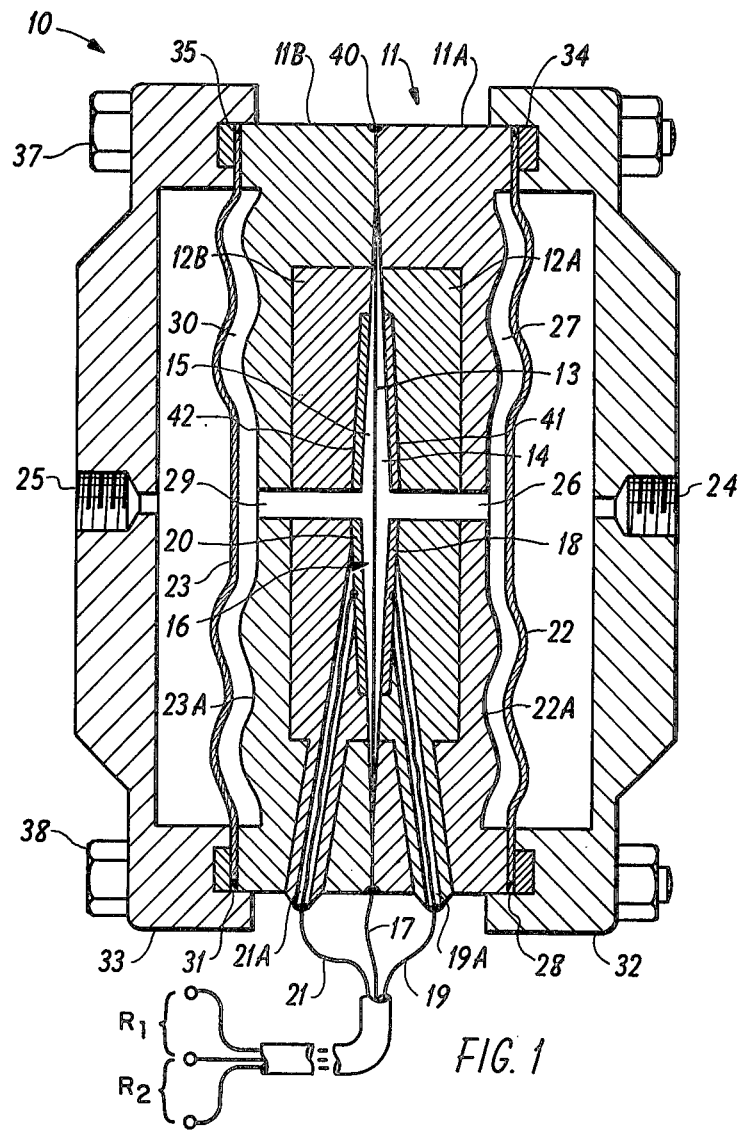

United States Patent [19]
Ezekiel et al.

[11] 4,172,387
[45] Oct. 30, 1979

[54] PRESSURE RESPONSIVE APPARATUS

[75] Inventors: Frederick D. Ezekiel, Lexington; Kenneth W. Petros, Norton, both of Mass.

[73] Assignee: The Foxboro Company, Foxboro, Mass.

[21] Appl. No.: 912,655

[22] Filed: Jun. 5, 1978

[51] Int. Cl.² .............................................. G01L 9/02
[52] U.S. Cl. ........................................ 73/719; 73/725; 338/38; 338/42
[58] Field of Search ................... 73/719, 725; 338/38, 338/42

[56] References Cited
U.S. PATENT DOCUMENTS 3,990,310  11/1976  Greer et al. .......................... 73/725

Primary Examiner—Donald O. Woodiel
Attorney, Agent, or Firm—Andrew T. Karnakis

[57] ABSTRACT

A liquid filled differential pressure transmitter includes a metallic measurement diaphragm within a pressure chamber and a pair of isolation diaphragms sealing the chamber from the process fluid which serve to transmit the applied pressure signals to the measurement diaphragm. The isolation diaphragms bottom against mating back-up surfaces to limit deflection of the diaphragm during overrange pressure conditions. An electrically conductive liquid fills the chamber so that measurable electrical resistances are established through the liquid between the measurement diaphragm and a pair of electrodes adjacent thereto formed on opposite walls of the chamber. As the measurement diaphragm deflects in response to applied pressure signals, the electrical resistance between the diaphragm and each of the electrodes changes providing an output signal which is a function of the applied differential pressure.

15 Claims, 2 Drawing Figures

PRESSURE RESPONSIVE APPARATUS

FIELD OF THE INVENTION

This invention relates generally to pressure measuring apparatus, and more particularly to such apparatus commonly employed in industrial processes for measuring differential pressures.

BACKGROUND OF THE INVENTION

For many years, industrial process control systems have used varied instruments for measuring fluid pressure, especially differential pressures developed across an orifice plate in a flow conduit so as to produce a signal which is a function of the fluid flow rate. Although these various prior art devices have performed adequately, it is evident that they cannot meet all the requirements of modern industrial process control systems.

In this particular field of art, the number of prior patent disclosures is very great. Generally, the pressure transmitters of the prior art have either employed force balance or deflection measurement (i.e., motion balance) techniques to produce an electrical signal proportional to the pressure to be measured. It is this latter category to which the present invention applies.

A large number of these motion balance devices involve capacitive techniques for measuring the relative deflection of a diaphragm in response to an applied pressure. For example, U.S. Pat. No. 3,618,390 discloses a fluid-filled differential pressure transmitter having isolation diaphragms for transmitting the pressure signal to a measurement diaphragm disposed therebetween. Capacitive plates are formed on the opposing pressure chamber walls adjacent the measurement diaphragm. In this manner, the relative positioning of the measurement diaphragm in relation to the walled capacitive plates provides an output signal proportional to the applied pressure. The accuracy with which these capacitances are measured, however, depends upon the excitation frequency. Unless proper electrical isolation and additional circuitry for making the output signal independent of the applied frequency is provided, pressure transmitters that measure relative capacitance may also be subject to output errors caused by external capacitive coupling effects. Additionally, such capacitive type sensors do not provide the ready capability of remoting all active electronics from the transmitter location. This can be important in certain applications in which adjustments must be made to the electronic transducing circuitry and where the transmitter is not readily accessable.

In U.S. Pat. No. 3,277,719 a differential pressure transmitter is disclosed which operates on the principal of variable inductance, i.e, changes in differential pressure are related to the change in position of an armature which in turn is sensed by the relative inductances of two external coils. Such devices suffer from the same drawbacks as capacitive type transmitters, namely their dependence on excitation frequency with an attendant need for added signal conditioning circuitry to assure accuracy, and the inability to provide simple removal of active electronic components from the transmitter.

Other pressure responsive instruments, of which U.S. Pat. No. 3,894,435 is representative, employ piezo-electric or similar strain gage elements to produce resistance changes which are a function of the strain in a mechanical element that is deflected by the applied pressure. While pressure devices operating on this principal of measurement overcome the aforementioned problems associated with the frequency domain, they involve stressing by bending or similarly deforming the force sensing element to produce the desired output signal. This frequently causes zero drift problems because such stressing can produce fatigue in the force sensing element, as well as relative motion between the strain gage and the force sensing element, thereby producing zero offset errors. Furthermore, strain gage pressure transmitters produce small electrical output signals which require additional circuitry for amplification and other signal conditioning.

Although the pressure transmitters discussed above have exhibited performance capabilities suitable for their intended applications, it is apparent that the need still exists for a pressure transmitter that is simple in construction, yet highly accurate and reliable to measure pressures under widely varying conditions.

SUMMARY OF THE INVENTION

Accordingly, the present invention provides an improved, relatively inexpensive structure for a pressure transmitter exhibiting high accuracy and long term reliability that is capable of producing large output signals involving minimal signal conditioning.

In accordance with a presently preferred form of the invention, a differential pressure transmitter includes a fluid tight cavity separated by a measurement diaphragm formed of conductive material into respective high and low pressure chambers and a pair of isolation diaphragms encapsulating the pressure chambers. A substantially incompressible fluid fills the entire cavity and serves to faithfully transfer pressure signals received at the isolation disphragms to the measurement diaphragm. However, unlike conventional liquid-filled devices, the present invention uses a fill fluid that is electrically conductive so that measurable electrical resistances are established through the liquid between the measurement diaphragm and a pair of electrodes, each insulated from the diaphragm and supported by the walls of the cavity on opposite sides thereof. Thus, the deflection of the diaphragm in response to applied fluid pressure signals produce a corresponding change in electrical resistance between the diaphragm and each of the terminals, thereby providing at the output of the transmitter a signal which is a function of the applied input pressure.

By utilizing the conductive properties of the fill fluid to produce a resistance change in response to diaphragm deflection, no active components are required at the transmitter. Thus the present invention allows the output sensing electronics, together with the span and zero adjusting circuitry, to be remotely located (i.e., one mile or greater) from the transmitter.

PREFERRED EMBODIMENT

The features of the invention will best be understood from the following description of the presently preferred embodiment and shown in the accompanying drawings:

DRAWINGS

Figure 2:
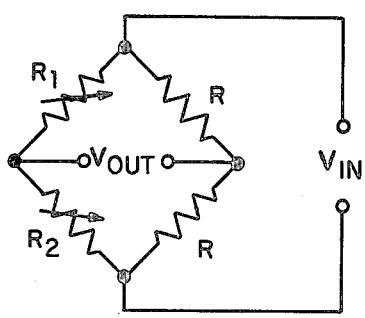

FIG. 1 is a diagrammatic view in section of a pressure transmitter embodying the features of the present invention; and FIG. 2 is a schematic circuit diagram for measuring the electrical resistance which is a function of applied pressure for the embodiment of FIG. 1.

DESCRIPTION

With reference to the drawings and specifically to FIG. 1, a differential pressure transmitter 10 includes a stainless steel body 11 comprising two generally symmetrical sections 11A, 11B and having central inserts 12A, 12B of dielectric material (e.g. glass). A fluid tight cavity 16 is formed in the center of the dielectric material which in turn is divided into a high pressure chamber 14 and a low pressure chamber 15 by a metallic measurement diaphragm 13. The inner surfaces 41, 42 of the dielectric are concavely formed to closely approximate the extreme deflection position of the diaphragm. A pair of flexible isolation diaphragms 22, 23 welded to the body around their peripheries as indicated by way of example at points 28, 31, seal the internal chambers of the body from the process fluid. Between each of the isolation diaphragms and their mating back-up surfaces 22A, 23A are isolation chambers 27, 30 which are connected with the pressure chambers 14, 15 through respective passageways 26, 29.

To complete the overall transmitter assembly, end covers 32, 33, having inlet openings 24, 25 for admitting the two process pressure signals to the isolation diaphragms, are secured to the body 11 by bolts 37, 38. A pair of suitable gaskets 34, 35 are positioned between the end covers and the body 11 along the periphery of the isolation diaphragms 22, 23 to hydraulically seal the process fluid from the surrounding environment. In construction, the measurement diaphragm 13 is welded along its circumference to the body sections 11A, 11B as shown at point 40.

Turning now to the details of the internal construction of the transmitter 10, high pressure side electrode 18 is formed on the concave surface 41 of the dielectric insert 12A so as to be insulated from the body section 11A. Electrical connection to this electrode is provided by a signal wire 19 drawn through a preformed passageway 19A in the dielectric insert. In similar fashion, a low pressure side electrode 20 is formed on the opposite concave surface 42 of the dielectric insert 12B and is insulated from the body section 11B as well as from the high pressure side electrode. A signal wire 21 passing through a passageway 21A, is connected to this second electrode. The measurement diaphragm 13, which is grounded to the body 11 (and thus electrically isolated from each of the two electrodes), serves as a third terminal in an electrical network whose operation will be described subsequently.

In accordance with a unique aspect of the present invention, all the internal cavities (i.e., the high and low pressure chambers 14, 15, the associated passageways 26, 29, and the isolation chambers 27, 30) of the body 11 are filled with an appropriate electrically conductive liquid, such as Propyl alcohol. (For purposes of clarity a distinct representation of the liquid is not provided in the drawings). Hence measurable electrical resistances are established between the measurement diaphragm 13 and each of the electrodes 18 and 20 through the conductive liquid by the signal wires 19, 21 and a signal lead 17 fixed to the body.

Fill fluids that have been employed in prior art devices, of which silicone oil is the most common, are universally considered as non-conductors of electricity. In fact, pressure transmitters employing capacitive or inductive measurement techniques are specifically designed to use fill fluids that act as insulators to preserve the accuracy of the output measurement. Conductive liquids may be categorized as "medium" conductors, of which alcohol-based liquids are typical. For example, depending upon its temperature, Propyl alcohol, exhibits a resistivity of from $8.0 \times 10^6$ to $20.0 \times 10^6$ ohms-inches. This is to be contrasted with the very good conductors, e.g., liquid mercury whose resistivity is $3.7 \times 10^{-5}$ ohms-inches.

The selection of an appropriate conductive fill liquid will depend on numerous factors that pertain to the intended application of the pressure transmitter. For example, the liquid must be stable over wide temperature excursions, that is it must not boil off at high temperatures nor freeze at low temperature. Additionally, the liquid should preferably exhibit minimal viscosity changes over these temperature ranges to assure adequate response characteristics.

Another important consideration in selecting the conductive liquid concerns the desireability of remotely locating (i.e. one mile or greater) the sensing and signal conditioning electronic circuitry from the transmitter. For example, the total resistance between any two electrodes having a conductive liquid therebetween can be approximated by $$R = r(L/A) \quad (1)$$

where:
R is the resistance in ohms;
r is the resistivity of the liquid in ohms-inches;
L is the separation between the electrodes in inches;
A is the area of the electrodes in square inches.

Referring once again to the configuration of FIG. 1, it can be readily determined that for a given geometry, the difference in electrical resistances between the measurement diaphragm 13 and each of the electrodes 18, 20 is directly proportional to the resistivity of the liquid for given deflections of the diaphragm. If great distances exist between the transmitter and associated processing electronics, a liquid possessing high resistivity is desirable in order to minimize the effects of transmission line voltage drops. Generally, for transmitting a signal one mile over 50 ohm line, the resistance measured between the diaghragm and the electrodes should be 100 times greater than the line resistance to maintain output error within acceptable limits. Conversely, if the electronics are closely coupled to the transmitter, a very low resistivity liquid can be used.

For the embodiment being described, the separation between the two electrodes 18, 20 is 0.010 inches and each electrode has an effective area of 0.3 square inches. Assuming Propyl alcohol fill fluid is used having a resistivity of $8.0 \times 10^6$ ohms-inches, substituting in Equation (1) yields a resistance between electrodes through the liquid of 260,000 ohms. Since the measurement diaphragm is positioned halfway between the electrodes in its non-deflected state, a "null" resistance of approximately 130,000 ohms is measured between the diaphragm and each electrode.

In operation, the measurement diaphragm 13 deflects approximately halfway (i.e., 0.0025 inches) toward the low pressure side electrode 20 when the transmitter is exposed to maximum operating differential pressure. This produces a net change of resistance between the diaphragm and each electrode of 130,000 ohms. Since this change in resistance varies in a known manner with the displacement of the diaphragm, the following relation applies:

$$(R_1 - R_2) \approx (r/A)(L_1 - L_2) \quad (2)$$

where:
- $(R_1 - R_2)$ is the difference in electrical resistance between the measurement diaphragm and each of the electrodes; and
- $(L_1 - L_2)$ is the difference in distance between the measurement diaphragm and each of the electrodes and is twice the diaphragm displacement.

Thus the difference in electrical resistance is a function of the deflection of the diaphragm, which in turn is directly related to the applied pressure.

Since the resistivity of the Propyl alcohol will vary over the operating temperature range of the transmitter, it is advantageous to compensate for such changes by ratioing the difference in resistances given in Equation (2) above to the sum of the resistances. Such a relationship is derived by connecting the signal leads 17, 19 and 21 to the output terminals of a Wheatstone bridge as shown in FIG. 2. Hence the output signal is expressed as follows:

$$\frac{V_{out}}{V_{in}} = \frac{(R_1 - R_2)}{2(R_1 + R_2)} = \frac{(L_1 - L_2)}{2(L_1 + L_2)} \quad (3)$$

Although the absolute value of $R_1$ and $R_2$ will change with temperature, the ratio of the difference to the sum of the resistances will remain a function of diaphragm deflection $$\left[ \frac{L_1 - L_2}{2} \right]$$

because the distance between the two electrodes 18, 20 $(L_1 + L_2)$ is constant in accordance with the invention. In this manner, the ratio of the output voltage to the input voltage applied to the bridge produces a close measure of diaphragm deflection (and hence applied pressure) that is essentially independent of temperature induced liquid resisitivity changes. The output voltage may then be fed to a voltage to current converter in conventional fashion to produce a corresponding 4–20 ma output signal that is compatible with most industrial process control applications.

It is also preferable to excite the Wheatstone bridge with a constant amplitude a-c input voltage signal. This avoids galvonometric and other electrochemical effects acting on the electrodes 18, 20 as may occur with the use of long term d-c excitation. At excitation frequencies between 1.000 Hz and 5 MHz the Propyl alcohol has been found to behave as a pure resistance.

As has been demonstrated, large resistance changes can be derived from quite small deflections of the diaphragm in accordance with the operation of the pressure transmitter. This feature not only improves the overall resolution of the device, but also eliminates the need for all active or passive components at the transmitter, thereby permitting the remote location of the signal processing electronics which frequently are unable to withstand certain severe environmental conditions at the transmitter location.

OTHER EMBODIMENTS

Although the invention has been described with respect to a specific illustrative example, it will be apparent that numerous changes can be made by one skilled in the art. For example, although the terms "high" and "low" have been used to designate the right and left hand sides respectively, of the pressure transmitter, it is understood that because of the symmetry and simplicity of the design, these designations can be easily reversed. Also the invention has been described in terms of a three diaphragm, liquid filled differential pressure transmitter. However, the principles related above are equally applicable to two diaphragm filled devices that may be used for measuring absolute or gage pressures, or in fact to other apparatus employing other pressure responsive members such as bellows and the like.

It will also be evident that a wide range of electrically conductive liquids can be substituted for Propyl alcohol and achieve similar results depending upon the particular application. Other such liquids are Benzyl alcohol and a solution of tetra-ethyl-ammonium iodide in propylene carbonate.

Still other modifications are possible without departing from the true spirit and scope of the invention as defined in the accompanying claims.

What is claimed is:

1. A pressure transducer for producing an electrical output signal that is a function of applied pressure comprising:
   - a body;
   - a pressure responsive element defining a pressure chamber with said body, said pressure responsive element having at least one deflectable surface of electrically conductive material, said deflectable surface forming a first electrode movable with respect to said body;
   - inlet means for applying a fluid pressure signal to said deflectable surface the corresponding deflection of which is a function of said applied pressure;
   - a second electrode mounted on said body adjacent said pressure chamber;
   - an electrically conductive liquid filling said pressure chamber and at least a portion of said inlet means between said first and second electrodes for establishing an electrical resistance between said electrodes through said conductive liquid; and
   - means for measuring said electrical resistance, whereby said resistance measurement is a function of the displacement of said deflectable surface and hence of said applied pressure.

2. Apparatus as claimed in claim 1 wherein said liquid is Propyl alcohol.

3. Apparatus as claimed in claim 1 wherein said liquid is Benzyl alcohol.

4. Apparatus as claimed in claim 1 wherein said liquid is a solution of tetra-ethyl ammonium iodide in propylene carbonate.

5. Apparatus as claimed in claim 1 wherein said pressure chamber is located within said body;
   - said pressure responsive element being a diaphragm extending across said chamber, thereby forming first and second pressure compartments therein.

6. Apparatus as claimed in claim 5 including means for applying process fluid pressure signals to each of said pressure compartments so that the deflection of said diaphragm corresponds to the differential pressure therebetween.

7. Apparatus as claimed in claim 6 including a pair of isolation diaphragms mounted on opposite sides of said body sealing said pressure compartments from the process fluid and limiting the deflection of said diaphragm during overrange pressure conditions.

8. A differential pressure transmitter for producing an electrical output signal that is a function of applied pressures comprising:

a body having a fluid tight cavity therein;

a diaphragm of electrically conductive material extending across said cavity forming first and second pressure chambers therein;

a first electrode within said cavity adjacent said diaphragm and insulated therefrom;

a second electrode within said cavity on the opposite side of said diaphragm insulated from said first electrode and said diaphragm;

a conductive liquid filling said first and second pressure chambers establishing an electrical resistance between each of said electrodes and said diaphragm through said liquid;

means for applying pressure signals to each of said pressure chambers producing deflection of said diaphragm corresponding to applied pressure; and sensing means for measuring said electrical resistance, whereby said resistance measurement provides an indication of diaphragm deflection.

9. Apparatus as claimed in claim 8 wherein said liquid is Propyl alcohol.

10. Apparatus as claimed in claim 8 wherein said liquid is Benzyl alcohol.

11. Apparatus as claimed in claim 8 wherein said liquid is a solution of tetra-ethyl-ammonium iodide in propylene carbonate.

12. Apparatus as claimed in claim 8 wherein said sensing means is essentially independent of temperature induced liquid resistivity changes.

13. Apparatus as claimed in claim 12 wherein said sensing means includes a Wheatstone bridge coupled to said transmitter to provide a ratio of the difference in electrical resistance between said diaphragm and each of said electrodes to the sum of the resistances thereof.

14. Apparatus as claimed in claim 13 wherein said sensing means is remotely located from said tranmitter.

15. Apparatus as claimed in claim 8 including a pair of isolation diaphragms mounted on opposite sides of said body sealing said pressure chambers and serving to transmit said applied pressure signals to said diaphragm; said apparatus further including means to limit the deflection of said diaphragm during overrange pressure conditions.

* * * * *